(No Model.) 2 Sheets—Sheet 1.
J. B. FOOTE.
CAN SOLDERING MACHINE.
No. 465,018. Patented Dec. 15, 1891.
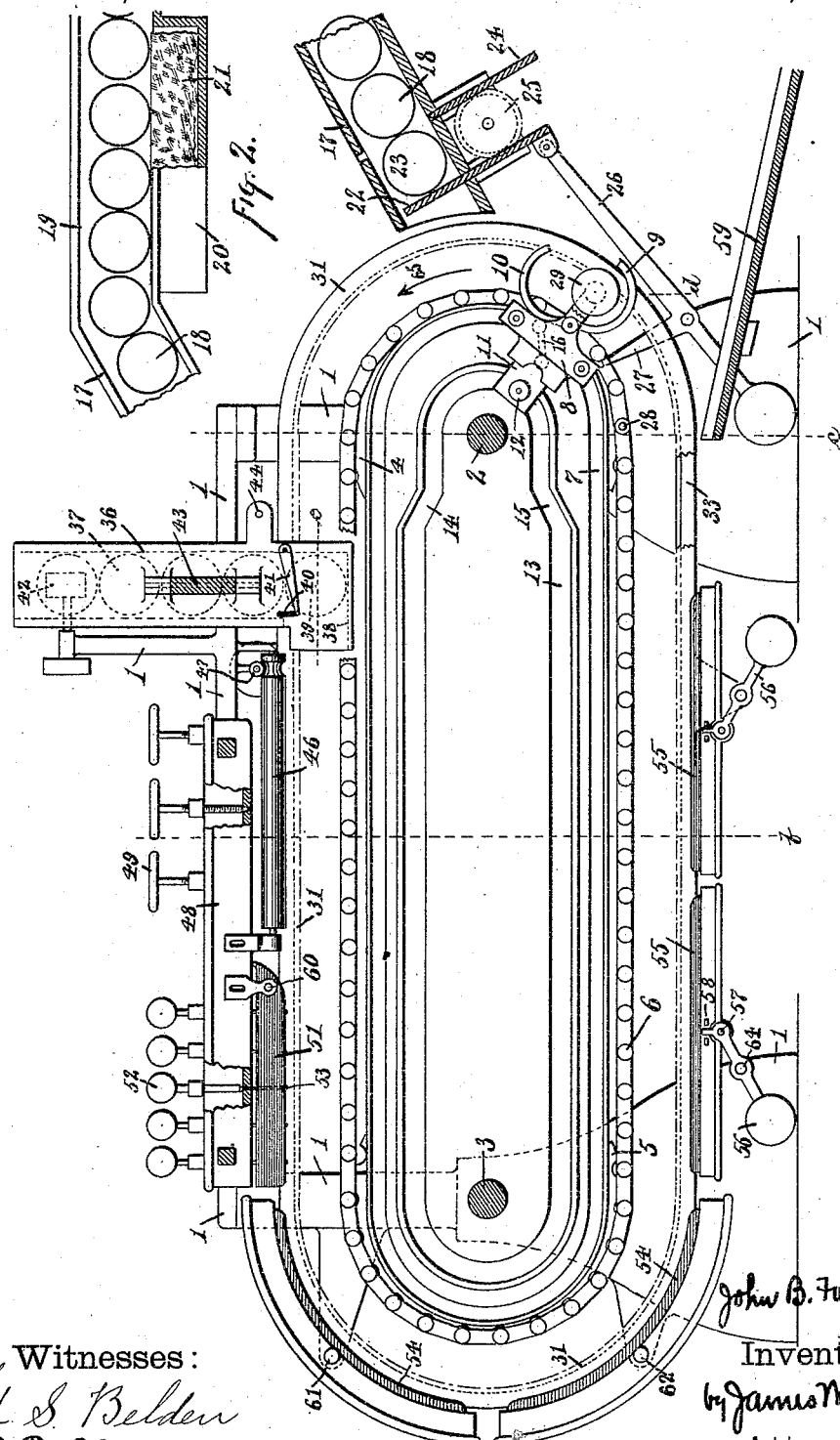
Witnesses:
M. S. Belden
P. P. Sheehan
Inventor
John B. Foote
by James W. See
Attorney (No Model.) 2 Sheets—Sheet 2.

J. B. FOOTE.
CAN SOLDERING MACHINE.

No. 465,018. Patented Dec. 15, 1891.

Witnesses:
M. S. Belden
P. P. Sheehan

John B. Foote
Inventor
by James W. See
Attorney

UNITED STATES PATENT OFFICE.

JOHN B. FOOTE, OF HAMILTON, OHIO.

CAN-SOLDERING MACHINE.

SPECIFICATION forming part of Letters Patent No. 465,018, dated December 15, 1891.

Application filed July 25, 1891. Serial No. 400,717. (No model.)

*To all whom it may concern:*

Be it known that I, JOHN B. FOOTE, of Hamilton, Butler county, Ohio, have invented certain new and useful Improvements in Can-Machines, (Case B,) of which the following is a specification.

This invention pertains to a machine adapted to receive topless and bottomless cylindrical can-bodies and apply to them the tops and bottoms and solder them on. These tops and bottoms will be hereinafter termed "caps." The bodies are received by a moving carriage which grasps the bodies, rounds them up and sizes them, carries them past a receiver containing the caps, applies a cap at each end of the body, carries the capped body forward and causes the circumferential seams to be soldered, and then discharges the completed can. The carriage moves in a continuous path and the events happen in a cycle. The capacity of the machine is only limited by the number of carriages with which it may be provided. In the exemplifying machine chosen for illustration the circuit-path of the carriage or carriages, if a number be used, is in the form of two semicircles joined by straight lines, and the movement of the carriage is produced by chains extending between sprocket-wheels. This particular form of circuit-path and this particular means of producing the movement of a carriage in an endless path is, however, not essential to a realization of my invention, which of course contemplates such modifications in the form of the path and in the means for producing carriage motion in the chosen path, as will suggest themselves to the skilled machine-constructer.

My invention will be readily understood from the following description, taken in connection with the accompanying drawings, in which—

Figure 3:
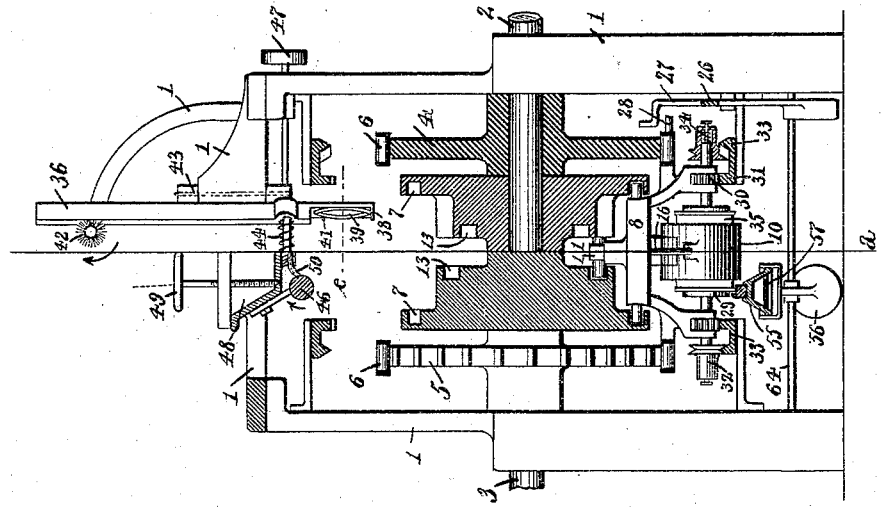

Figure 1 is a vertical longitudinal section of a machine exemplifying my invention, the section being taken in the plane of line *a* of Fig. 2, many of the parts, however, appearing in elevation. Fig. 2 is a vertical longitudinal section of a portion of the body-receiving chute, shown separate from Fig. 1 on account of shortness of the sheet on which the drawing is made; Fig. 3, a vertical transverse section of the machine, part end elevation, the section to the left of the central line being taken in the plane of line *b* of Fig. 1 and the portion to the right of the central line being taken in the planes of lines *c* and *d* of Fig. 1; and Fig. 4, a plan and horizontal section of the cap-feeder, the portion to the right of the central line appearing in plan, while the portion to the left of that line appears in horizontal section in the plane of line *e* of Figs. 1 and 2, this view showing, also, a can-body in the act of approaching the can-receptacle, no carriage, however, being shown in connection with this can-body.

In Fig. 1 the carriage is shown open and in what might be called its "starting position"—that is to say, as being empty and just starting in its circuit of performance—while Fig. 3 shows the carriage as containing a can and subjecting it to about the final performance upon it.

Figure 4:
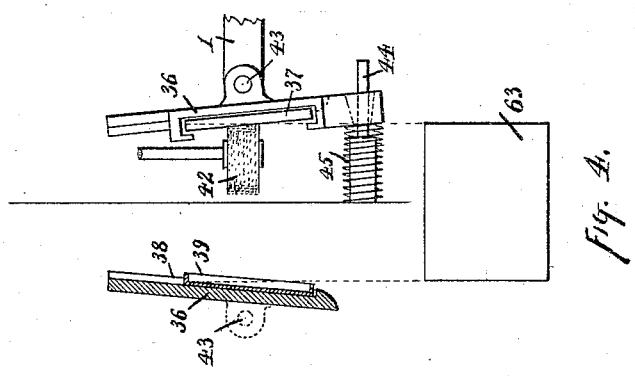

In the drawings, 1 indicates fixed frame parts requiring no further description than that they are designed to give rigid support to various operative parts of the machine; 2, a horizontal shaft at one end of the machine; 3, another similar shaft, the design being that power from any suitable source will be applied to one of these shafts to drive the machine in a continuous manner; 4, a pair of sprocket-wheels fast on one of these shafts; 5, a pair of sprocket-wheels on the other shaft in line with the first pair of wheels; 6, a pair of chains driven by the sprocket-wheels; 7, a pair of guide-tracks, one at each side of the machine and extending in an endless manner along the circuit formed by the chains; 8, a carriage engaging these guide-tracks by studs or rollers and adapted to move in an endless path as defined by the track and having the chains attached to it, so that as the chains move the carriage is moved along in an endless circuit, this carriage, by the way, being merely representative of a series of carriages which may be attached to the chain in a similar manner; 9, a semicircular clamp rigidly attached to the carriage with its axis parallel to the shafts which give motion to the carriage, the bore of this clamp being adapted nicely to the size of can-body in hand, so as to neatly fit the same and still permit of the rotation of the can-body in the clamp; 10, a similar clamp, but pivoted to the carriage so as to open or close with reference to the fixed clamp, the two clamps thus forming when closed a complete circle around a can-body and adapted to open wide enough to permit the sidewise entrance of the can-body, the length of the clamps being somewhat less than the distance between the cap-flanges on the completed can; 11, a cross-head working in the carriage at right angles to the shafts; 12, studs or rollers projecting sidewise from this cross-head; 13, endless guide-tracks engaged by these studs and extending along the circuit of the machine, being at one place one distance from the carriage and at another place a less distance, whereby as the carriage moves in its circuit the cross-head is moved once in and out once at each passage over the circuit, the inner position of the cross-head corresponding with the open position of the clamp and the outer position of the cross-head corresponding with the closed position of the clamp, Fig. 1 showing the clamp as open; 14, inclines in these tracks where the closing of the clamp is effected; 15, inclines in these tracks where the opening of the clamp is effected; 16, a link connecting the cross-head with the pivoted clamp, so that the inward and outward movement of the cross-head effects the opening and closing of the clamp; 17, a chute down which the capless can-bodies roll to the machine; 18, capless can-bodies on their way down this chute to the machine; 19, a horizontal portion in this chute along which the can-bodies are propelled by means usual in can-factories—as, for instance, by carrier-belt acting below or above the can-bodies or by the pressure of can-bodies received by the horizontal portion of the chute from a downwardly-inclined portion preceding it; 20, a tank for rosin solution disposed under this horizontal portion of the chute; 21, long wicks projecting up from this tank in position to be engaged by the rims of the cans as they roll along the chute, the wicks projecting down into the tank, so that their upper portions are always wet with the rosin solution; 22, a gate sliding across the chute close to the machine and serving to prevent the advance of the series of can-bodies; 23, the advanced one of the series of can-bodies, the one directly against this gate; 24, a cut-off adapted to slide across the chute parallel with the gate, but earlier in the length of the chute by a distance equal about to the diameter of a can-body; 25, a toothed wheel engaging the gate and cut-off and serving to transmit motion from one to the other, so that as the gate is withdrawn the cut-off rises, and vice versa, whereby when the gate is withdrawn the cut-off goes up in front of the second can-body and the first one is then at liberty to roll down to the machine; 26, a weighted lever adapted to operate the gate and cut-off, the lever being so weighted as to hold the gate normally closed, as in Fig. 27, an arm on this lever; 28, a tappet moved by the chains, being shown as projecting directly from a chain and adapted to strike the arm 27 and open the gate and close the cut-off, the position of this tappet with reference to the carriage being such as to release the most advanced can-body just at the time when the open clamp is in position to receive that can-body; 29, a pair of disks, one at each end of the clamp, carried on spindles mounted in the carriage concentric to the bore of the clamp, the spindles being adapted to move endwise in their bearings, so that the disks may move a short distance to and from the clamps; 30, a pinion mounted upon the spindle of each disk and splined thereto, so as to permit of the sliding motion of the splindles; 31, endless racks supported by the framing and engaging these pinions, so that as the carriage moves through its circuit the disks are in continuous rotation; 32, circumferentially-grooved hubs on the spindles of the disks and adapted for a small amount of endwise motion thereon; 33, endless tracks adapted to engage these grooved hubs throughout the circuit of the carriage, these tracks determining the endwise position of the hubs and consequently the disks, the tracks being of such width throughout their general length as to cause the disks to tightly press the caps that may be upon the can-body held in the clamp, but having a greater width at a portion of their length, so that the disks will be drawn and held much farther apart; 34, springs in the grooved hubs tending to urge the disks inwardly from the hubs, so that the inward pressure produced by the hubs upon the disks is a yielding one, the outward movement of the hubs, however, being positively imparted to the disks; 35, Fig. 3, a can-body held in the closed clamp and having the caps pressed upon by the disks; 36, two upright grooved plates disposed over the carriage-path and adapted each to receive a vertical series of caps and support those caps, with their flanges inwardly, at a distance apart corresponding substantially with the length of the can-bodies, these two receptacles for caps constituting the cap-feeder of the machine; 37, the vertical series of caps in the feeder; 38, an inwardly-projecting ledge at the base of each plate of the cap-feeder, these ledges serving to limit the descent of the series of caps and sustain the lowermost caps of the two series in such position that the plane of their axes will correspond with the plane of the axis of the clamp as the carriage passes the cap-feeder; 39, the lowermost caps, those supported by the ledges; 40, slots in the plates of the feeder in front of the lowermost caps; 41, detents pivoted to each plate of the feeder and projecting a short pin through the just-mentioned slots, this pin coming in front of the lowermost cap, but somewhat above its center, so as to prevent the lowermost caps from rolling freely to the left out of the feeder, the forward walls of the feeder-plates being absent below, so that the lowermost caps have no restraint in this direction except as offered by these detents, the detents rising, however, and permitting the forward movement of the caps whenever force is applied to move the caps forward; 42, rotary brushes, driven by power, at the top of the feeder, these brushes being intended to insure the downward movement of the caps; 43, vertical pivots by which the plates of the feeder are supported, these pivots permitting the plates to rock, 44, a distance-stud disposed between the plates at one side of the pivots and serving to limit the inward movement of the rear edges of the plates; 45, a spring disposed upon this stud and serving to press the plates into a position with their rear edges apart so that the lowermost caps in the plates stand at a slight angle to the path of the carriage, the rearmost edges of the two caps being apart a distance somewhat in excess of the length of the can-body, and the foremost edges being a somewhat less distance apart, as will be readily understood from Fig. 4, in which 63 indicates a can-body approaching the caps; 46, a pair of solder-delivering rolls disposed parallel with the path of movement of the carriage and beyond the cap-feeder and in such position that as the carriage carries a can along under the rolls the rolls will be rubbed by the cap-seams of the can; 47, a worm-shaft driven by power and giving continuous rotary motion to these rolls; 48, a solder-vessel disposed over the rolls and forwardly beyond the same and adapted to contain melted solder; 49, a series of screw-valves arranged in this soldering-vessel over the rolls and engaging drip-holes in the bottom of the solder-vessel over the rolls, these valves serving as means for permitting solder to flow in regulated quantities to the rolls; 50, wipers, as of asbestos, disposed along the rolls and serving as the rolls rotate to distribute the solder uniformly over their surfaces; 51, soldering-ribs disposed under the solder-vessel beyond the soldering-rolls and, like the rolls, adapted to be rubbed by the cap-seams of the advancing can, these soldering-ribs being supported on pivots, so that they may rise and fall, and thus accommodate themselves to the passing cans, these ribs being also vertically perforated, so that melted solder may drop down through them; 52, gravity-valves in the solder-vessel over these soldering-ribs and engaging holes in the solder-vessel over the perforations in the soldering-ribs, these valves, however, instead of being screw-valves, being held closed by gravity and having stems projecting down through the perforations in the soldering-ribs and a trifle below the ribs, so that as the cans pass under the soldering-ribs they will open the valves for an instant and have solder fed to the seams from the downwardly-projecting stems; 53, the lower ends of these stems just referred to; 54, soldering-ribs disposed in the paths of the cap-seams beyond the solder-ribs 51, these soldering-ribs, however, having no solder-feeding qualities and being curved to conform to the curvature of the carriage-path; 55, additional soldering-ribs disposed still farther along in the circuit; 56, weighted levers supporting the last-mentioned soldering-ribs and tending to hold them up in position to engage the passing cans, but permitting them to yield to suit the cans; 57, pivots by which these levers support their soldering-ribs, these pivots permitting the rocking of the soldering-ribs, whereby they become still better adapted to accommodate themselves to the cap-seams of the cans; 58, stops to limit the rocking of the soldering-ribs upon these pivots, whereby the soldering-ribs are maintained normally in a position substantially parallel with the carriage-path; 59, a chute to receive the finished can-bodies as discharged from the machine and permit them to pass away; 60, pivots which support the soldering-ribs 51; 61, the pivots which support the upper ones of the soldering-ribs 54; 62, the pivots which support the lower ones of the soldering-ribs 54; 63, Fig. 4, a can-body approaching its caps, shown, however, regardless of the carriage which moves it; 64, the pivots which support the levers 56, and 65 an arrow indicating the direction of motion of the carriage.

The individual details being understood, but little explanation will be required as to the operation of the entire machine.

Referring to Fig. 1, first notice arrow 65, showing the direction of carriage motion. Next assume that the cap-feeder contains a supply of caps, which supply is to be maintained, the lowermost caps of the series in the feeder being borne by the ledges 38 at a level corresponding with the level of the passing can-body and supported obliquely, as indicated in Fig. 4, so that the can-body can enter between them. Assume the carriage in the position shown in Fig. 1 and empty and the clamp open and the disks spread. Capless can-bodies roll along chute 19 and in passing over the wicks 21 their rim ends become supplied with rosin solution. The can-bodies are held back from the machine by the gate 22. The soldering-ribs and the melted solder are to be kept hot by properly-applied gas-jets, as usual. Continuous forward motion is to be given to the carriage and continuous rotary motion is to be given to the solder-rolls and continuous rotary motion is to be given to the cap-feeding brushes. As the carriage reaches the body-chute the gate goes down and can-body 23 rolls into the open clamp, the cut-off rising to intercept the balance of the can-bodies in the chute. The gate immediately rises and the cut-off retreats, thus leaving a new can-body in position to go to the machine at the next arrival of the carriage. The carriage advances with the can-body, and when incline 14 is reached the clamp is closed upon the can-body, thus rounding up and sizing the can-body, whose two ends project beyond the ends of the clamp. The can-body is carried in between the two caps and its advanced portion engages within the forward portions of the flanges of the caps, and thereupon the advancing can-body seeks to drag the caps out of the cap-feeder. In order to do this the feeder-plates must open more at their fronts against the pressure which holds them in divergent relation to each other. The consequence is that the two caps are pressed upon the can-body and dragged from the feeder, whereupon new caps take position on the ledges and the feeder-plates return to their divergent position ready for the next can-body. Immediately upon the carriage leaving the feeder the rotating disks move inwardly and press upon the caps and rotate the capped can in the clamp. While the can is thus rotating it passes along the solder-rolls 46 and the cap-seams become charged with solder. The cans then pass forward and become subjected to the action of the soldering-ribs 51, 54, and 55, additional solder being received as the seams pass under the soldering-ribs 51. The result is the thorough soaking and soldering of the seams. After leaving the final soldering-ribs the disks separate and incline 15 opens the clamp and the can is discharged onto chute 59, and the carriage goes forward and receives another can-body, as before. In the exemplification the disks are always in rotation, the rack 31 being endless; but it is of course not necessary that the disks rotate during the interval between the completion of the soldering of one can and the application by the cap-feeder of the next pair of caps, but the continuous rotation of the disks does no harm and the continuous rack is preferable to an interrupted one.

The capacity of the machine is limited only by the number of carriages which are carried in the endless circuit.

The form of the endless circuit (shown as consisting of two parallel lines connected by semicircles) is not material, the form selected in the exemplification being a mere incident to the employment of sprocket-wheels and chains chosen to illustrate a suitable mechanism for moving carriages in an endless path past the operative devices.

I claim as my invention—

1. In a can-machine, the combination, substantially as set forth, of a pair of yielding cap-holders arranged to support two caps divergently with their nearer edges a distance apart less than the length of a can-body and a carriage arranged to support a can-body and carry the same between said caps while in said cap-holders.

2. In a can-machine, the combination, substantially as set forth, of a carriage provided with a clamp to encircle a can-body, rotating disks smaller than the can-caps mounted upon the carriage and pressing upon the caps of the can, and soldering appliances arranged in series to engage and rub the cap-seams as the carriage moves the rotating can along them.

3. In a can-machine, the combination, substantially as set forth, of a pair of yielding supports adapted to support a pair of caps divergently with their nearer edges a distance apart less than the length of the can-body, and a carriage provided with a clamp encircling and fitting the can-body and arranged to carry the can-body between said caps while in said cap-holders.

4. In a can-machine, the combination, substantially as set forth, of a carriage adapted to support a can, rotary disks to turn the can in the carriage, a pair of rolls in position to rub the cap-seams of the rotating can, a solder-vessel over the rolls, and regulating-valves to control the flow of solder from said vessel to the rolls.

5. In a can-machine, the combination, substantially as set forth, of a carriage arranged to support a can, rotary disks to rotate the can in the carriage, perforated soldering-ribs in position to rub the seams of the rotating can, a solder-vessel over the ribs, and gravity-valves to control the flow of solder from said solder-vessel through the perforations in said ribs and having stems protruding through said perforations and adapted to be engaged by the passing can.

6. In a can-machine, the combination, substantially as set forth, of a carriage arranged to support a can and carry it forward, rotary disks to turn the can in the carriage while being carried forward, solder-applying devices in position to be engaged by the cap-seams of the advancing and rotating can, soldering-ribs to be rubbed by the cap-seams of the advancing and rotating can, pivots disposed at right angles to said ribs and permitting them to rock, and pivoted levers supporting said first-mentioned pivots and permitting them to move to and from the can.

7. In a can-machine, the combination, substantially as set forth, of a pair of grooved cap-holders adapted to support a vertical series of caps, ledges at the bases of the cap-holders to limit the descent of the series of caps, rotary brushes engaging caps in said series and urging them downwardly, and a carriage adapted to support a can-body and carry it between said series of caps.

8. In a can-machine, the combination, substantially as set forth, of a traveling carriage, a fixed clamp-arm carried thereby, a second clamp-arm arranged to open and close upon a can-body, a chute arranged to drop can-bodies upon said fixed clamp as the carriage passes the chute, a gate to stop the advance of the can-bodies in the chute, a tappet arranged to withdraw said gate and permit the foremost can-body to go to the carriage, and a cut-off connected with said gate and arranged to intercept the second can-body when the gate is withdrawn.

9. In a can-machine, the combination, substantially as set forth, of a chute along which can-bodies may roll, a rosin-tank disposed below said chute, and wicks in said rosin-tank projecting above the floor of the chute in position to engage the can-bodies.

10. In a can-machine, the combination, substantially as set forth, of a carriage adapted to receive a can-body and carry it forward, rotary disks to rotate the can in the carriage as it travels, a cap-feeder, solder-applying devices and solder-soaking devices arranged in series along the path of forward movement of the carriage to rub the seams of the rotating can.

JOHN B. FOOTE.

Witnesses:
　J. W. SEE,
　JAS. FITTON.